R. W. AYLING.
BUTTING TOOL.
APPLICATION FILED OCT. 15, 1919.
1,352,341.
Patented Sept. 7, 1920.
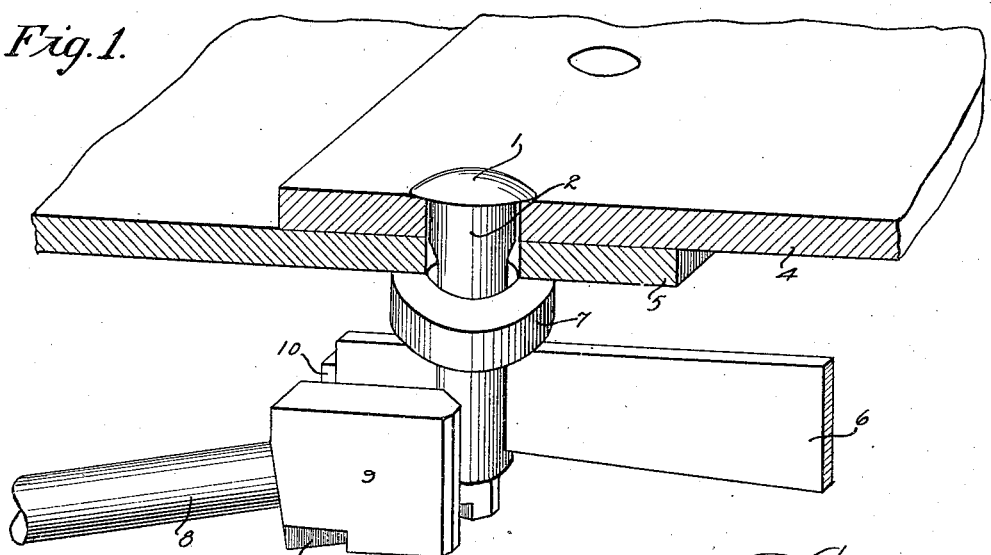
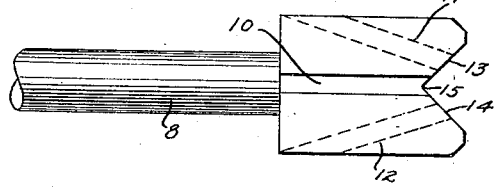
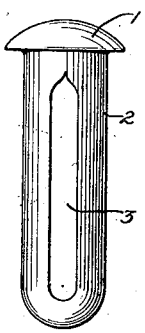
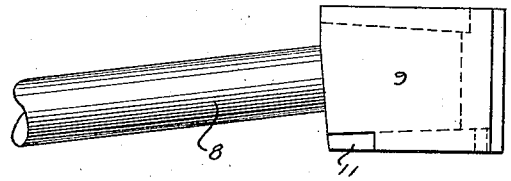
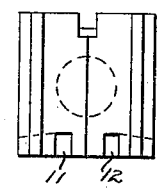
WITNESSES
L. A. Paley
A. L. Kitchin.
INVENTOR
Robert W. Ayling.
BY
ATTORNEYS

UNITED STATES PATENT OFFICE.

ROBERT WILLIAM AYLING, OF WEST NEW YORK, NEW JERSEY.

BUTTING-TOOL.

1,352,341.

Specification of Letters Patent.

Patented Sept. 7, 1920.

Application filed October 15, 1919. Serial No. 330,879.

*To all whom it may concern:*

Be it known that I, ROBERT W. AYLING, a citizen of the United States, and a resident of West New York, in the county of Hudson and State of New Jersey, have invented a new and useful Butting-Tool, of which the following is a full, clear, and exact description.

This invention relates to tools used in temporarily bolting sheet plates together, and has for an object the provision of an improved construction wherein the tool will coact with a wedge for causing a temporary bolt to be properly positioned when acting as clamping means for holding two sheet plates together.

A further object of the invention is to provide a tool which may be held manually against a bolt when applying a wedge thereto so as to cause the bolt to always remain in correct position as the wedge produces a tightening action thereon.

In the accompanying drawing:

Figure 1 is a perspective view showing in a fragmentary manner, a pair of overlapped plates together with a bolt and a butting tool associated therewith, said butting tool disclosing an embodiment of the invention.

Fig. 2 is a top plan view of the butting tool shown in Fig. 1.

Fig. 3 is an elevation of a temporary clamping bolt.

Fig. 4 is an edge view of the tool shown in Fig. 2.

Fig. 5 is a front view of the tool shown in Fig. 2.

In producing the butting tool forming the invention, it has been aimed to overcome certain objections which have arisen when applying a temporary bolt for holding plates together. In building ships, where either the side plates, deck plates or other plates are riveted together the plates are first bored or punched before they are brought into position. Originally an ordinary bolt and nut was used at intervals for rigidly clamping these plates together so that a reaming tool could be used for truing up the holes not occupied by the temporary bolts. After this has been done hot rivets are then placed in position and riveted down in the usual manner after which the temporary bolts are removed and the holes trued and rivets are then placed in the holes occupied by the temporary bolts. In order to expedite the application and removal of the temporary bolts a new form of bolt, shown in Fig. 3 is provided, the same being formed with a head 1 and a body 2 formed with a slot 3 extending for almost the full length of the body. This bolt is placed in position as shown in Fig. 1 for temporarily bolting the plates 4 and 5 together. The wedge 6 acts against the bolt and against a suitable washer 7 for tightening the bolt and clamping the plates 4 and 5 in position, and the wedge is driven into the slot as far as possible. In driving the wedge 6 in place the temporary bolt is sometimes inclined to one side and thereby shifts slightly the plates 4 and 5. This shifting is not noticed at first and consequently produces a bad job, which must be rectified in some manner. When the temporary bolt is to be removed the wedge 6 is merely knocked out and the bolt may be easily removed by hand after which the hole occupied thereby may be reamed and supplied with a rivet in the usual manner. To prevent the inclination of the bolt when applying the wedge 6 the butting tool embodying the invention has been produced, which is positioned as shown in Fig. 1 during the time that the wedge 6 is being driven into the bolt. The butting tool is provided with a handle 8 and a head 9 formed in the upper part with a groove 10 extending parallel with the sides of the head 9 while on the bottom of the head inclined or diverged grooves 11 and 12 are formed to take care of the angle of the wedge 6 when the temporary bolt is near an upright or wall. The bolt engaging face of the head 9 is provided preferably with annular face sections 13 and 14 merging at a central line 15. These face sections may be rounded, but are preferably flat so as to engage the body 2 of the bolt at a distance from the central line 15.

In operation, the body 2 of the temporary bolt is dropped into any two registering plates 4 and 5, washer 7 applied thereto and then the wedge 6 placed in position manually. The head 9 is then arranged, for instance as shown in Fig. 1, and the wedge 6 driven home. The action of the head 9 will be to maintain the bolt 2 in correct position, or at a right angle to the plates 4 and 5, whereby the holes will always be maintained in proper alinement. This arrangement prevents the slotted bolt from being driven to one side by the blow of a hammer on the wedge 6, while all of the wedge action desired may be secured for clamping the plates 4 and 5 tightly together without injuring either the plates, the split bolt, or any of the associate parts.

What I claim is:

1. A butting tool comprising a head formed with a bolt receiving face, a wedge guide, and a handle extending from said head.

2. A butting tool comprising a holding member, a head formed with a groove on one face, a plurality of grooves on the opposite face, and a converging bolt receiving face extending substantially at right angles to said grooves.

3. A butting tool comprising a handle and a head therefor, formed with a face having spaced contact portions for engaging a bolt at two points, a set of diverging grooves arranged in the top and a single groove in the bottom.

4. A butting tool comprising a head formed with a V-shaped notch acting as a contact face for pressing against a bolt when in use, a slot on one face extending parallel to the sides of the head, and a pair of diverging slots on the opposite side to the first mentioned slot, and a handle for holding the head in proper position when in use.

ROBERT WILLIAM AYLING.